Patented Aug. 7, 1934

1,968,847

UNITED STATES PATENT OFFICE 1,968,847

STRUCTURAL ADSORPTIVE CARBON AND PROCESS OF MAKING SAME

Jacque C. Morrell, Oak Park, Ill.

No Drawing. Application January 28, 1933, Serial No. 654,112

3 Claims. (Cl. 252—3)

This invention relates to the production of adsorptive or activated carbons. More particularly, it relates to an improvement in the concepts and processes of my previously issued patents for the production of adsorptive charcoals or activated carbons. These issued patents are #1,478,985, December 25, 1923, Artificial or synthetic charcoal and process of producing the same; #1,478,986, December 25, 1923, Manufacture of artificial charcoal; #1,478,987, December 25, 1923, Production of adsorbent charcoal; #1,530,392, March 17, 1925, Process of making compound adsorbent catalysts; #1,530,393, March 17, 1925, Process of making adsorbent cotton.

It is the principal object of this invention to produce structural adsorptive or activated carbons. In activated carbons of this type it is very important that the supporting walls of the individual particles be dense or firm and that the particle or grain itself possess the necessary structural strength required of the granular type of carbons. As examples are the carbons which possess sufficient structural strength to permit their use in filter columns or beds without excessive disintegration, comparable to bone black, such as is employed in filter columns in the refining of sugar, or to the activated charcoals such as cocoanut char used for vapor adsorption from gases, in gas masks, catalysts, etc. The structural strength of these and other types of chars is of highest importance since the life of the material depends upon its maintaining its original size and granular form. The term "structural activated carbon" as used herein further means a material which may be employed in a granular condition and implies the necessary structural strength to withstand or resist shattering, abrasion and crushing for practical purposes and to be retained in a granular or particle form of relatively large size.

The product of the present process may be employed in various industrial processes as a decolorizing and purifying agent for the removal of color and impurities from liquids and solutions, the removal of vapors from gases, purification of air, as a catalyst, and in general it may be applied wherever adsorptive decolorizing or purifying material of structural character is required. It is to be understood, of course, that the structural product may be reduced in size and may be used in a finely divided or powdered condition. Among its specific uses are the refining and decolorization of oils and their derivatives; the refining and decolorizing of mineral, animal and vegetable oils; as a catalyst; for decolorizing, purifying and refining sugar solutions, syrups such as those from cane, corn, maple and sorghum, glycerine, and aqueous and non-aqueous solutions of organic and inorganic compounds; purification of water and as a deodorant. Other uses are: purification of gelatins, phenols, drugs, medicinals, pharmaceuticals, and the bleaching and purification of various crude and partly refined off-grade and off-flavored food and vegetable oils, including cottonseed, linseed, rapeseed, cocoanut, soya bean, and animal oils and fats, such as lard, fish oils, medicinal oils, paint oils, varnishes and resins, garage wastes, etc.

In a broad aspect the present invention comprises mixing finely divided carbon with a binder which chars on heating, compressing, molding, briquetting or extruding this mixture, or in general a mixture of carbon and a binder which chars on heating, under a substantial pressure, subjecting the mixture to a temperature adequate to carbonize the said binder and thereafter to an activation treatment, such as treatment with steam at elevated temperatures or with other mild oxidizing agents. Preferably the molded or briquetted product is comminuted before carbonizing but there may be conditions under which it is carbonized, or partially carbonized, first and then comminuted. In some cases the product is subsequently treated with a solvent such as hot water and/or dilute acid to remove ash or inert substances therefrom. The final product of the present invention is of a granular structural form of suitable size and may be employed in filter columns, beds, etc.

The best types of structural charcoals or carbons are those which possess a large degree of porosity of the duct or sponge type, i. e., continuous, the pores, ducts or capillaries of which are of the proper size and character, while at the same time having the necessary supporting structural or mechanical strength to withstand disintegration in the uses for which such structural chars are employed. It is this quality that is supplied to the product by molding, compressing, briquetting or extruding under pressure. To further assist in obtaining the necessary strength while maintaining adsorption efficiency mixtures of specific types and in some cases specific proportions of carbons, as well as in some cases specific types and proportions of binders, are employed in connection with the present invention.

In compressing, briquetting, molding or extruding, the pressure may vary from several hundred pounds per square inch or sufficient pressure only to mold the mixture to several hundred tons. Preferably in excess of one ton per square inch is employed.

In one of its more specific aspects the invention comprises mixing a relatively inactive carbon, such as coke from the distillation and/or cracking of petroleum, coal and the like, and cokes from the destructive distillation and cracking of various tars such as coal tar, lignite tar, gas tar and retort cokes generally, etc., or from the destructive distillation of corresponding pitches, asphalts and the like, as well as coals such as anthracite, semi-anthracite, bituminous and sub-bituminous coals, and in general carbons derived from materials of a mineral character, with a binder which chars on heating, the said binder more particularly comprising a tar or pitch from animal or vegetable matter, preferably from the latter, and in general of a non-mineral origin or character, compressing the mixture, molding, briquetting or extruding the same, heating to carbonize the binder, preferably after comminuting the molded or compressed product and then activating, usually by heating in the presence of steam. The final product is granular in form, structural in character, and may be comminuted to proper size if desired.

The inactive carbon may be defined further as that resulting from the coking of solid or liquid mineral carbonaceous or hydrocarbon substances such as those cited, e. g., petroleum and coal, including anthracite, bituminous coal, and tars obtained therefrom, and in general the carbon residues remaining from the destructive distillation of tars, particularly of mineral origin. As a border line case and therefore not strictly equivalent to the other inactive carbons, which however may not even be equivalent among themselves from the viewpoint of quality of product and results obtained, carbon from the destructive distillation of lignite may be considered as a mineral carbon and for purposes of the present classification may be considered as inactive. On the other hand, the carbon obtained from the destructive distillation of peat, because of its distinctly vegetable character, may not be considered as inactive. The tar obtained from the destructive distillation of peat or the corresponding pitch may be used as a binder and even that obtained from the destructive distillation of lignite, while not equivalent to the vegetable tars and pitches generally and while not as desirable, will produce a more active product when treated in conjunction with the inactive carbons than tars and pitches, e. g., from petroleum and coal.

Some of the existing theories regarding active and inactive carbon indicate that an active carbon is essentially free from adsorbed stabilized hydrocarbons which are normally associated with it and which reduce its power of combining with other substances, and is also free from inactive carbon formed by the decomposition of hydrocarbons upon its surface at relatively high temperatures, e. g., above approximately 1000° F.

The carbons which I designate as inactive carbons, and these in general are of mineral origin, such as cokes from petroleum, coal, etc. or from the destructive distillation of tars therefrom, when associated with a binder such as a petroleum residue or coal tar pitch and heated above, e. g., 1200° F. do not permit the production of a satisfactorily active product for practical purposes. This is readily illustrated by the following examples: A mixture of petroleum coke and coal tar pitch employed in the ratio of 1.9 parts by weight of petroleum coke to one part of coal tar pitch when made up in accordance with the method described in the present invention showed a decolorizing efficiency of approximately 35 per cent on a standard raw sugar solution. On the other hand, when a wood tar pitch, such as a hardwood tar pitch or similar vegetable tar or pitch, preferably the pitch is substituted for the coal tar pitch. In the above example the decolorization efficiency when tested in the same manner was approximately 70 per cent.

The binders used in the present case are generally those which char on heating, such as pitches and tars, preferably pitches, the latter being in general the residues produced from organic substances such as oils, tars, etc. when subjected to destructive distillation in complete or partial absence of air and to such an extent that a complete carbon residue is not produced and which may be a heavy or viscous liquid, semi-solid or solid, the latter usually softening or liquefying when heated.

Some of the common classes of binders which may be used in the present invention are tars and corresponding pitches which include those produced from wood, peat, straw, hulls, including those from waste materials such as sawdust, shavings, stalks and husks, bagasse, nut hulls and shells, fruit pits and vegetable matter generally, also tars from bone and animal matter generally. Tars and pitches from the destructive distillation of animal and vegetable matter generally, including those from stearin, palm oil, bone fat, packing house fat, garbage, sewage, grease, etc. Preferably the tars and pitches from the destructive distillation of wood are employed.

It is contemplated within the scope of the invention to employ as binders resins, lignins, the residues from waste liquors from various industries such as those from the paper industry, although it to be distinctly understood that these are not considered upon an equivalent basis to the tars and pitches cited above, nor are they as desirable for the purpose.

Where the cokes or inactive carbons contain a natural binding material, which may be the case in connection with incomplete carbonization of petroleum and tars, a sufficient quantity of the tars and pitches of the character described may be employed to permit compression and/or molding of the mixture and at the same time to permit satisfactory activation of the carbonized product. For example, while a substantially devolatilized coke may require approximately one part of pitch binder to two parts of coke, a coke containing approximately 15 per cent or upward of volatile matter and which shows a general tendency to cake or flux when heated to relatively high temperatures but which is distinctly different from a pitch may require only one part of pitch of the character described to approximately four parts of the coke.

It is to be particularly pointed out that the above generalizations may apply to both cracking-still and coking-still coke with reference to the treatment of petroleum as well as retort cokes from various tars, such as those from coal tar, lignite tar, gas tar and the like. It may be well recognized that the degree of coking and the product produced in respect to volatile matter may be controllable and that coke products containing various percentages of pitch may be produced from the various raw materials cited or similar raw materials, the amount of additional binder comprising, e. g., pitch and/or tar or oil, to be added depending as described upon the amount of binder naturally present in the coke as the result of the method and conditions of production of the coke itself.

While I prefer to employ the process of mixing the carbon with an emulsion of a binder, the preparation of which is disclosed in my patent, serial #1,440,356, or with emulsions of suitable binders prepared in some other manner, other methods of incorporating the carbon with the binder may be employed as disclosed in the aforementioned issued patents and/or hereinafter. Some of the methods of accomplishing the mixing are:

(a) The carbon may be mixed directly with the emulsified binder either as such or the carbon may be suspended in or wetted by an aqueous medium and mixed with the emulsified binder. In many cases the water contained in the emulsion will be separated from the mixture by filtration and by evaporation, or preferably by evaporation alone, but in some cases the mixture containing the emulsion may be compressed or briquetted directly before comminuting and/or heating to carbonize the binder.

(b) The carbon may be mixed with a solution of a binding material which chars on heating, separating the solvent by distillation and/or evaporation either before or after compressing the mixture as found necessary or desired. The solvent may be a relatively low boiling liquid such as benzol, naphtha, petroleum hydrocarbons containing pitch or asphalt dissolved therein, or higher boiling solvents may be used and the solvent may be separated later as a separate operation if desired or if necessary, or the compressed material may be charred directly, preferably after comminuting.

(c) The carbon may be mixed with a liquid binder which chars on heating, such as a tar directly produced or similar product thereto, such as an oil added to a pitch.

(d) The carbon may be mixed with a soft pitch directly or one which is rendered fluid by heating. In some cases mixing may be facilitated under heat, i. e., the mixture is heated while mixing.

(e) The carbon may be mixed with a non-fluid (solid) pitch or other non-fluid binder which chars on heating and may also thereafter be mixed with or wetted or moistened by a fluid such as oil, tar of the character previously referred to in connection with the present invention, or other organic liquid which will dissolve, disperse or flux with the binder. It is desirable to mix the mixture of carbon and non-fluid pitch binder with an oil or tar before compressing but where no liquid is employed the mixture is heated before and/or during compression. It is to be understood, however, that it may be heated even when the wetting liquid is employed. The moistening or wetting liquid added to the mixture of carbon and the binder may also be in an emulsified state and this is especially desirable in many cases. In some cases the carbon may be wetted with the oil and the non-fluid binder incorporated thereafter or combinations of the various methods may be employed. Oils and tars, including cracked fluid hydrocarbon residues, are preferred in this connection. The emulsion may be prepared as described previously, or in any other satisfactory manner.

In general, the preferred methods of mixing the mixture of carbon with the binder are (a) and (e). In (a) the water is preferably kept at minimum to permit direct evaporation or compression. In (e) the oil or tar is added either directly to the mixture of binder and carbon or preferably as an emulsion, or in various combinations as desired.

However, all of the above methods are effective, although it may be readily understood that they are not equivalents.

In all cases above the mixture is compressed, molded, briquetted or extruded under pressure, comminuted to proper size, subjected to heat treatment to carbonize the binder and activated in most cases by steam treatment and/or other treatment. In some cases the molded product may be directly carbonized and thereafter comminuted to proper size.

In some cases it may be desirable to add to the mixture of carbon and binder a substance which is to be later removed by solution with a solvent, e. g., calcium carbonate, calcium oxide, dolomite, finely divided metals, metal oxides, salts, etc. These substances may be removed from the product preferably after activation by treatment with a solvent, e. g., water when the material is water soluble, and a dilute acid, e. g., hydrochloric, when the material is acid-soluble. It may also be desirable to add substances to the material which volatilize and/or react with the carbonaceous material during the treatment, such as zinc chloride, phosphoric acid and similar materials.

It may be desirable in cases where too much ash is present, such as where coals are employed, to treat the final product with an acid, e. g., hydrochloric acid, finally water-washing and drying the product. It is of importance to point out that in cases where petroleum cokes, and in general cokes produced from the destructive distillation of tars, pitches and the like are employed in the mixture in connection with the present invention that no acid treatment may be required to produce a highly efficient product.

It is to be understood that the methods and various modifications thereof described, or in general in the foregoing, are not to be considered as equivalents in the sense of quality of product or results produced, the particular method and combination chosen depending upon the raw materials employed and the results desired.

The term "carbon" as herein employed is intended to cover pure carbon as well as a mixture of natural or artificial origin containing a high percentage of carbon.

The following description shows one of the methods of operating the process. Finely divided coke, e. g., petroleum coke, or one of the cokes or inactive carbons mentioned heretofore, may be mixed with an emulsion of pitch prepared, for example, by first suspending finely divided hardwood pitch in a solution of alkali, e. g., sodium carbonate, ammonia, etc., the pitch being sufficiently hard to grind or otherwise comminute, e. g., 200–300° F. melting point, and mixing with the said suspension of pitch an emulsion of oil which may be a coal tar or other tar distillate, e. g., anthracene oil, creosote oil, or the like, by agitating the oil with an equal volume of an emulsifying agent, which consists of water containing dissolved therein one of the classes of protective colloids previously referred to, e. g., casein dissolved in an alkali solution. The suspension of pitch and emulsion of oil are mixed with the finely divided carbon. It is to be understood that other types of satisfactory emulsions may be employed. The water is removed, e. g., by filtration and subsequent evaporation or in most cases and preferably simply by evaporation alone, and the mixture is then compressed, molded, briquetted or extruded.

In some cases the material may be directly compressed without drying, or it may be dried after compression. The compressed or molded material may then be crushed or comminuted and is then subjected to heat treatment to carbonize it. The carbonized product may then be subjected to activation by steam treatment or by other oxidizing gas, such as air, chlorine, flue gas and the like, or other activating treatments. In the compressing or molding process pressures varying from several hundred pounds per square inch or only sufficient to compress the mixture up to several hundred tons may be employed.

In the carbonizing treatment temperatures of from approximately 900° F. to 1800° F., more or less, may be employed. Temperatures of 1300° F. to 1500° F. are preferred. For steam activation or other gas activating treatments temperatures of from 1200° F. 1800° F., more or less, may be employed with preferred temperatures of 1600° F. to 1750° F. The acid concentrations for the treatment of the activated products (when employed) may vary from less than 1 per cent to 10 per cent and upwards and various acids may be employed, such as hydrochloric, sulphuric, etc., preferably the former. During carbonization and activation the time of treatment will depend upon temperature conditions as well as other conditions and schedules varying from fifteen minutes up to several hours and longer have been employed.

A more specific example describing the preparation of decolorizing and/or adsorbent charcoal according to my process is given below.

The raw materials used in this particular case are petroleum coke or similar cokes, or inactive carbons such as those mentioned, and a vegetable pitch binder or corresponding tar, e. g., wood tar pitch. Hardwood tar pitch of approximately 200 to 250° F. melting point, or of sufficient hardness to be ground, is employed in making the suspension of the binder. The pitch is ground approximately 50 mesh and upward, preferably by first crushing and then grinding, using a protective colloid such as casein which is dissolved in an alkali solution, preferably sodium carbonate solution or dilute ammonia. Creosote oil from the distillation of high temperature coal tar or other coal tar distillate is emulsified in the solution made by dissolving casein in an alkali, such as sodium carbonate. The emulsion of oil is added to the suspension of pitch, or vice versa, to prepare the emulsified binder, as disclosed in my Patent #1,440,356. As an example of the preparation of the casein solution, approximately 1 per cent by weight of sodium carbonate may be dissolved in water, the solution heated to approximately 150° F. and into the heated alkaline solution is stirred approximately 2 per cent by weight of casein. The solution is preferably allowed to cool before using.

The solution may be diluted before making up the pitch suspension, which may be prepared by adding an equal part by weight of the diluted solution to the finely divided pitch and stirring and/or grinding. To this is added an emulsion of oil, preferably from coal tar, e. g., creosote or anthracene oil prepared by emulsifying the oil in an equal part of the aforementioned casein solution. In preparing this emulsion the oil may be added slowly to the casein solution and vigorously agitated during or between additions until the required quantity of oil has been added. The oil emulsion is then mixed with the pitch suspension, the resulting system containing a stable emulsion of soft pitch in the proportion, e. g., of 20 to 60 parts of the creosote oil for each 100 parts of the hard pitch. It is desirable to add to the emulsion of soft pitch prepared as described a small amount of ammonium tannate solution (a solution of tannic acid containing a small amount of ammonia) to stabilize the same.

The petroleum coke in finely divided form, e. g., of approximately 200 to 250 mesh, is then mixed with the emulsion. In some cases the carbon may be moistened with some of the dilute casein solution. As one example, the final mixture of creosote oil, pitch and charcoal may contain approximately 40 to 50 parts of oil, 100 parts of pitch and 190 parts of carbon by weight, and in addition there will be present very small proportions of soda ash or sodium carbonate and casein. These proportions may vary considerably, the above example being given in connection with a good structural charcoal. The proportions of carbon may generally vary from approximately 1.6 to 6.0 parts relative to the pitch, depending upon the amount of volatile matter and/or pitch present originally in the coke and other factors, e. g., for a completely devolatilized coke 1.9 parts of carbon to 1 part of pitch may be employed, and for a coke containing e. g. 15 to 20 per cent of volatile matter, e. g., from a cracking operation, 5 parts of carbon mixture to one part of pitch may be employed. These figures are given simply as examples, although they represent desirable working proportions.

As a general rule, only sufficient water is present in the emulsion to permit thorough mixing with the carbon, and the water may then be removed or separated by evaporation or other means. In some cases the carbon is wetted with the aqueous medium and then mixed with the emulsified binder. In such cases the water may be somewhat in excess of an equal quantity relative to the suspended materials and filtration may then be desirable to separate part of the water, the mixture then being dried by evaporation or otherwise. It is preferred, however, to have only sufficient water present so that the materials may be thoroughly admixed and then dried directly by evaporation. In some cases the mixture may be compressed before or without drying.

During drying lumping may occur, and it may be desirable that the mixture be kept in more or less a state of agitation to obtain proper drying, although this will depend upon circumstances. It is not necessary that the mixture be completely dried as the presence of small amounts of water facilitates molding or briquetting. In some cases the mixture of emulsified binder and carbon may be compressed or molded directly, the amount of water in such cases being kept to a minimum. The mixture, preferably while warm or heated, is compressed, molded or briquetted, preferably under pressures, e. g., from one ton to ten tons per square inch, e. g., I have found pressures of 2.5 tons per square inch quite satisfactory as a working pressure, although any suitable pressure which gives the desired results will suffice. The compressed material is then carbonized. Preferably the compressed or molded product or briquettes are then crushed and/or ground to the desired size before carbonization. In some cases they may be ground to, e. g., 8 mesh and upwards, carbonized and then subsequently further treated, or they may be reduced to smaller size if desired for further threatment. If used for filtering liquids the product prior to carbonizing may be reduced to smaller size as desired, e. g., 15 to 20 mesh and smaller. The principal question here is to avoid losses in going through several grinding operations. Fines accumulating before carbonizing may be recompressed again. In some cases the molded material is carbonized directly and then comminuted or crushed and/or ground to proper size. It is preferred, however, that the molded product be comminuted before carbonizing.

While I have described in detail the preparation of a mixture by one of the methods employed in the present invention in preparing the mixture of carbon and binder, it is to be understood that other methods such as those previously described may be employed, e. g., the carbon may be mixed directly with a soft pitch binder (preferably under heat) or a solution thereof, or with a finely divided hard pitch binder alone or by the addition later of a small amount of oil or tar or other solvent for the binder, and in general with a binder which chars on heating, and subsequently compressed and subjected to carbonization and/or to the other treatments described in accordance with the process. For example, a char of good decolorizing and refining efficiency may be prepared by employing two parts of petroleum coke substantially devolatilized and one part of hardwood tar pitch of approximately 200° F. melting point in finely divided form and well mixed, and 0.25 parts of creosote oil added and mixed with the mixture later. The product may then be molded, comminuted, carbonized and activated by steam treatment as described. When a coke containing 20 per cent volatile matter is employed (this coke caked or fluxed at high temperatures) a ratio of 5 parts of petroleum coke to 1 of the binder was used. (Other cokes may be employed instead of petroleum coke.) These proportions are simply illustrative and by way of example only.

While not upon a strictly equivalent basis, various coals may also be employed instead of petroleum coke, the anthracite type requiring a smaller proportion of binder than the bituminous coals; for example, where anthracite coal is employed the ratio of coal to binder may be 2:1, whereas where bituminous coals are employed with volatile matter content in excess of 20 per cent the ratio of coal to binder may be approximately 4:1. It is to be understood that the use of coal is not equivalent to the use of coke.

In the carbonization operation, heating schedules from twenty to sixty minutes at temperatures varying from 1200° F. to 1500° F. have been found satisfactory. Generally speaking, carbonization in thin layers is preferred. The use of a continuous rotary type of retort has been found satisfactory. The principal object here is to heat the material uniformly and prevent formation of secondary inactive carbon. After the carbonization treatment the product is subjected to a second heat treatment in the presence of steam at temperatures between approximately 1500° F. and 1800° F. for about twenty minutes to two hours. In some cases it has been found desirable to introduce steam into the charge while undergoing carbonization.

While I have described the preparation of a structural activated char employing certain mixtures and conditions, it is to be understood that these examples are merely for illustrative purposes, as many possible combinations between the inactive carbons and binder material that char on heating, such as those shown or mixtures, may be made.

In general, the carbons may be distinguished from the binders in that the carbons are not liquefied nor do they soften by relatively low temperature heat treatment and usually the amount of volatile matter is less than non-volatile, whereas generally the binders do soften or liquefy by heat treatment and are usually higher in volatile matter. However, the carbons may contain considerable volatile and/or binding matter on the one hand and may undergo some caking when heated to high temperatures, and the binders may contain considerable free carbon on the other. The binders may be materials of a pitchy, asphaltic, resinous or similar characteristic which may be in a non-fluid or solid state or which may be of such melt point characteristics as to conform to the shape of the containing vessel.

It is usually preferred that the inactive carbon base be ground to 200 mesh or above, although approximately 50 mesh and above may be found satisfactory. Where the hard pitch binder is mixed directly with the carbon as such it may also be ground to 50 mesh or above, preferably 100 and above.

While it has been assumed in the past that heating materials of a hydrocarbon character in the presence of carbon base, or even alone, at temperatures approximately above 1000° F. would render the resultant product very difficult, if not practically impossible, to activate, apparently the specific types of binders employed in the present invention even when employed in conjunction with carbonaceous material, which is ordinarily considered inactive or very difficult to render active, permit the formation and production of an active carbon or one which is easily rendered active by subsequent treatment such as with steam at high temperatures. It is to be specifically pointed out in this connection that the use of binders of the coal tar or petroleum, asphalt or pitch types will produce carbons under the same conditions of treatment as those employed for tars and pitches from animal and vegetable sources, which are relatively inactive.

The ratio of coke or carbon base to pitch (on the basis of hard pitch) may be approximately 1.5 to 6 of the carbon to 1 of the pitch, with a preferred ratio of approximately 2:1 where the coke or other inactive carbon contains only a small amount of volatile matter, and a ratio of approximately 4:1 where the volatile matter in the coke is high, e. g., above 16 per cent, and shows a tendency to cake at high temperatures.

As further specific examples of results obtained the following are given:

When employing a petroleum coke containing approximately 5 per cent of volatile matter, using 2 parts of petroleum coke and 1 part of a wood tar pitch binder (on the basis of hard wood pitch) a product showing approximately 75 per cent decolorization of a standard raw sugar solution (15 to 80 mesh carbon used in the test) may be employed. When employing a coke from coal instead of petroleum coke, with other conditions being approximately the same, a product showing 68 per cent decolorization may be obtained. On the same basis a high grade bone black would show somewhat less than the last product mentioned.

The percent decolorization shown will vary as a function of the amount and kind of material to be treated or refined as well as the particular char employed and the conditions of treatment.

When employing cokes from the destructive distillation of coal tar pitches and similar tars good results of the order of those shown may be obtained when hardwood pitches and similar vegetable pitches are employed. When used in conjunction with petroleum, asphalt or coal tar pitch binders, these cokes produced inactive products by the process. When employing pitches from other vegetable materials besides wood, in conjunction with cokes from petroleum and coal, good results may also be obtained.

Cokes from the destructive distillation or cracking of petroleum and its derivatives give good results.

The binder ratio based on pitch in the mixture in the above cases was approximately 1.8:1 to 2:1 where the volatile matter in the coke was less than 8 per cent and 4:1 to 5:1 where the volatile matter exceeded 16 per cent, with intermediate proportions as required. For structural purposes binder ratios of less than 2.5:1 are preferred where the coke contains only a small per cent of volatile matter.

In the above examples the pitch was in an emulsified condition or added direct as a hard pitch. The oil used in the examples is on the basis of approximately 10 to 40 per cent by weight of pitch employed. (If soft pitch is used directly, equivalent amounts may be employed.) This ratio may, of course, be changed depending on the results desired and materials employed. Creosote oil or anthracene oil may be employed and are preferred, but other coal tar distillates and wood tar or similar distillates, tars and petroleum oils, e. g., cracked liquid residues, may be employed in conjunction with the pitch. The weight of pitch employed is on the basis of a hard pitch melting at approximately 200° F. to 250° F. This data is given simply to characterize the proportion used in the above examples rather than to limit it, and of course it must be borne in mind that the results obtained may not be equivalent for various combinations.

By "binder ratio" is meant the amount of carbon to pitch employed, e. g., 2:1 means 2 parts by weight of carbon to 1 part pitch. By the term "compressing" in the claims is meant subjecting the mixture to pressure of any form, e. g., molding, briquetting, extruding, rolling and the like.

Results comparable to those shown may be obtained by the other modifications described herein but the method used in these specific cases is preferred.

The above examples are given for illustrative purposes only and it may be readily recognized that many combinations of inactive carbon base and binder of the character described may be employed and many mixtures, either alone or in admixture. It may be also recognized that the conditions of treatment, such as temperatures of carbonizing and activation, may vary, all within wide limits. Hence the specific examples are not to be considered as limitations upon the broad scope and spirit of the invention.

I claim as my invention:

1. A process for the production of structural activated carbon suitable for refining, purifying and decolorizing purposes which comprises mixing a mineral carbon of the class consisting of coals and cokes with a tar binder derived from a vegetable material selected from a group consisting of peat, hardwood, straw, stalks, nut shells and fruit pits, compressing the mixture under substantial pressure and subjecting the compressed material to a temperature adequate to carbonize and to char the binder, and activating the resulting product by heating in the presence of a gas having a mild oxidizing action.

2. A process for the production of structural activated carbon suitable for refining, purifying and decolorizing purposes which comprises mixing a mineral carbon of the class consisting of coals and cokes with a pitch binder derived from a vegetable material selected from a group consisting of peat, hardwood, straw, stalks, nut shells and fruit pits, compressing the mixture under substantial pressure and subjecting the compressed material to a temperature adequate to carbonize and to char the binder, and activating the resulting product by heating in the presence of a gas having a mild oxidizing action.

3. Activated carbon comprising the activated product of a mineral carbon of the class consisting of coals and cokes and a uniformly distributed carbonized tar binder derived from a vegetable material selected from a group consisting of peat, hardwood, straw, stalks, nut shells and fruit pits.

JACQUE C. MORRELL.